Patented Apr. 26, 1938

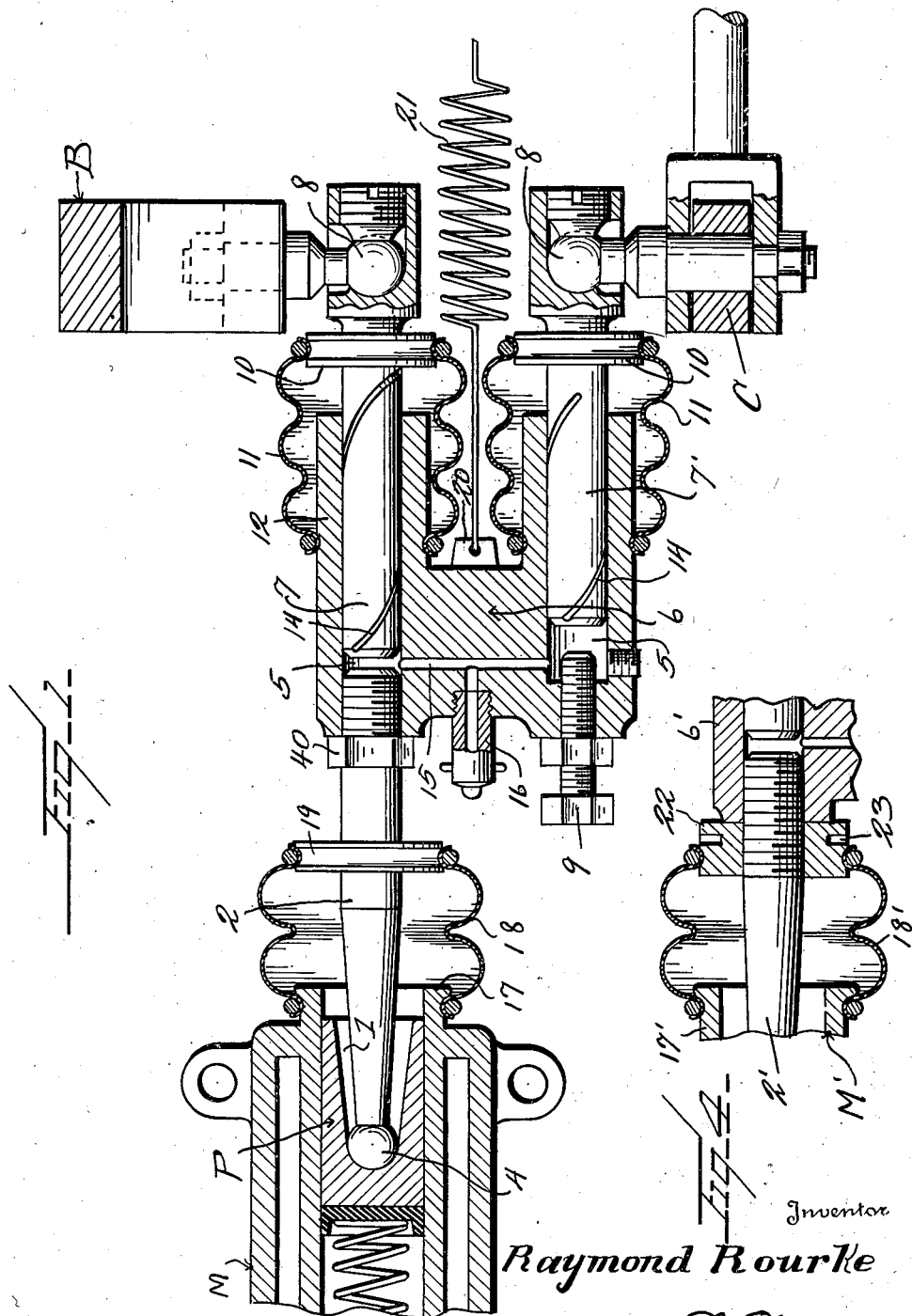

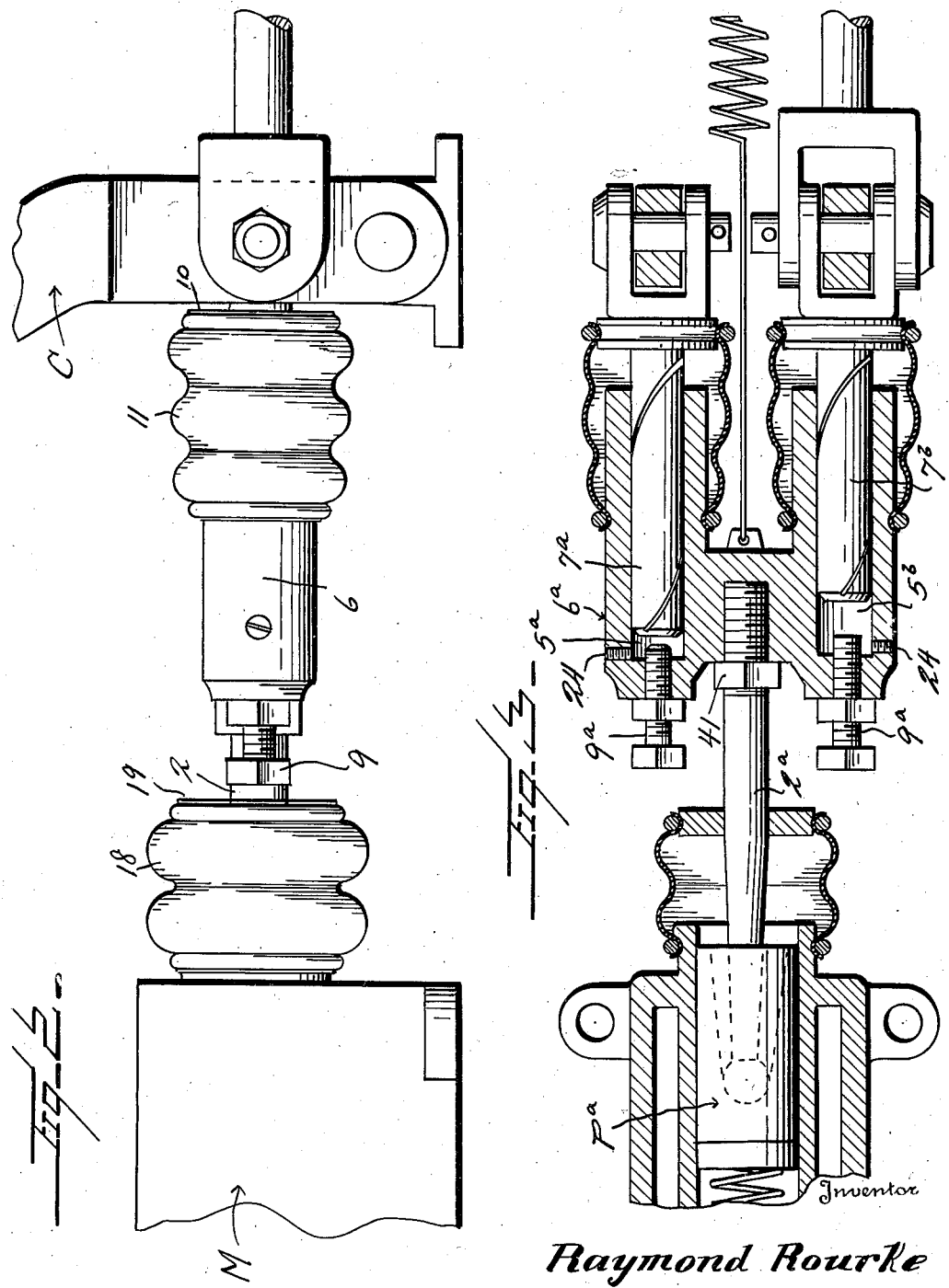

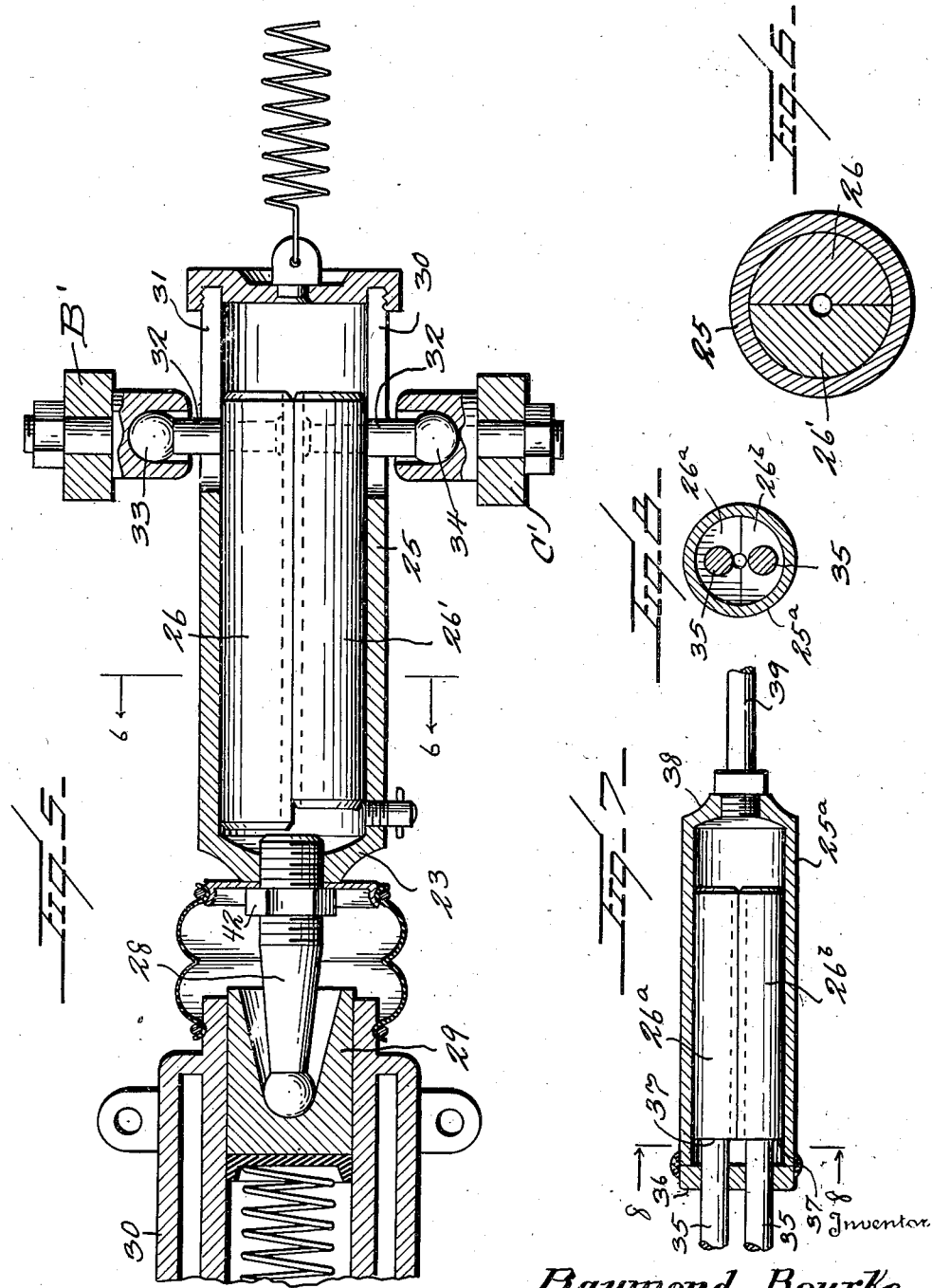

2,115,215

UNITED STATES PATENT OFFICE 2,115,215

BRAKING SYSTEM FOR VEHICLES

Raymond Rourke, Portageville, N. Y.

Application March 20, 1937, Serial No. 132,161

12 Claims. (Cl. 192—13)

This invention relates to a braking system for a vehicle and more particularly a hydraulic system, and it is primarily an object of the invention to provide a novel and improved construction permitting either a brake pedal or a clutch pedal to be independently operated to apply the brakes without transmitting motion to the other pedal, and it is a more specific object to permit the clutch pedal to serve under certain conditions as a supplemental brake pedal.

It is also an object of the invention to provide a brake system of this kind with means to brake a car and particularly to hold the car on an up-grade and in a manner to leave free a foot of the operator to step on the gas.

Another object of the invention is to provide means whereby the operating parts of my improved structure may be effectively lubricated.

It often occurs when a vehicle is stopped, as for example by a traffic signal it will not stand still and it is necessary to apply the service brake or the emergency brake in order to hold the vehicle from moving. To get the vehicle started again it is necessary to release the brake and in either operation it is not easy to accelerate the motor and release the brake at the same time and more particularly when starting on an up grade. My present invention avoids these difficulties and provides an efficient brake system which may be operated by the left foot and thus leave free the right foot to control the motor.

When parking a vehicle or moving a vehicle out of a parking station, it is generally necessary to move back and forth several times and by the present invention under such circumstances the brake and clutch both are operated by the clutch pedal thus freeing the right foot to control the motor and making it unnecessary to shift the foot from the accelerator to the brake at the end of each run, thus making it much easier to move a vehicle.

The invention consists in the details of construction and in the combination and arrangement of the several parts of my improved braking system for a vehicle whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view partly in top plan and partly in section and of somewhat a diagrammatic character illustrating the features of a braking system comprising my invention;

Figure 2 is a fragmentary view in side elevation of the structure as illustrated in Figure 1;

Figure 3 is a view similar to Figure 1 illustrating another embodiment of my invention;

Figure 4 is a fragmentary view partly in section and partly in elevation illustrating another embodiment of my invention and particularly as pertains to an expansion shield for lubricant;

Figure 5 is a view similar to Figure 1 illustrating a still further embodiment of my invention;

Figure 6 is a detailed sectional view taken substantially on the line 6—6 of Figure 5;

Figure 7 is a view partly in section and partly in elevation and also of somewhat a diagrammatic character illustrating an additional embodiment of the invention;

Figure 8 is a sectional view taken on the line 8—8 of Figure 7.

In the invention as particularly illustrated in Figures 1 and 2, M denotes a master cylinder which is comprised in a hydraulic system and in which operates as is well known a pressure piston P. The outer end portion of the piston P is formed to provide an inwardly tapering socket 1 in which is received the outer end portion of the piston rod 2. The outer extremity of this rod 2 is formed to provide a spherical tip or bearing 4 and the inner end portion of the socket 1 is correspondingly formed so that limited universal swinging movement of the rod 2 with respect to the piston P is permitted to compensate for such side sway as may occur. The inner end portion of the rod 2 threads within and closes an end portion of a cylinder or bore 5 provided in a block 6. This block 6 is also provided with a second bore or cylinder 5' which is parallel to the bore or cylinder 5. Snugly engaging within the bore or cylinder 5 for rectilinear movement is a push rod 7 of a length to have an end portion at all times extending beyond the block or body 6 or more particularly the bore or cylinder 5 in which it operates. The outer portion of this push rod 7 is operatively connected preferably through a ball and socket coupling 8 with the brake pedal B which is mounted and operated in a conventional manner. Operatively engaged within the second bore or cylinder 5' is a push rod 7' of a length less than the length of the rod 7 and which has an outer end portion operatively connected as by a universal joint 8' with a clutch pedal C. The movement of the clutch pedal C and the resultant clutch clearance is regulated by an adjusting screw 9 threading into the inner end portion of the bore or cylinder 5' and with which the inserted end of the rod 7' has direct contact.

Each of the rods 7 and 7' outwardly of its cylinder or bore carries a surrounding head or adapter 10 to which is secured an end portion of an expanding sleeve 11 and which sleeve in turn surrounds an extended portion 12 of the block or body 6 and secured thereto. This sleeve 11 is preferably of a flexible rubber compound and provides effective means to protect its associated push rod from dust and water.

Each of the rods 7 and 7' is provided along its periphery with spiral grooves or ducts 14 to accommodate grease forced into the bores or cylinders 5 and 5' to assure effective lubrication of the rods 7 and 7'. This grease as it is forced through the ducts or grooves 14 also finds its way within the sleeves 11 and the grease as contained within these sleeves provides for further effective lubrication of the push rods.

Adjacent the inner end portions of the bores or cylinders 5 and 5' the block or body 6 is provided with a port 15 in communication with said bores or cylinders 5 and 5'. This port 15 has in communication therewith a fitting 16 whereby the grease as desired may be forced into the cylinders or bores 5 and 5' and along the grooves or ducts 14 into the sleeves 11.

The master cylinder M as herein disclosed is provided with an extended annular flange 17 to which is secured an end portion of an expansible sleeve 18, the opposite or outer end portion of which sleeve being effectively secured to a surrounding enlargement or adapter 19 carried by the push rod 2 at a point closely adjacent to the block or body 6. This sleeve 18 serves to provide effective protection to the piston P against foreign matter.

In this embodiment of my invention it is to be noted that the push rod 7 has straight line pressure connection with the piston push rod 2. It is also to be noted that the push rods 7 and 7' float in the bores or cylinders 5 and 5' respectively and in practice these rods 7 and 7' are allowed to travel about five eighths of an inch lengthwise of the bores or cylinders. This travel is calculated by the mounting of the master cylinder M from a braking pressure in the master cylinder, and the back position of the brake pedal B.

The forward movement of the brake pedal B will cause the push rod 7 to contact with the push rod 2 which is fast to the block or body 6. The push rod 7' is free in its cylinder or bore 5' and will not float with the block or body 6 and the push rod 2. When the brake pedal is released it moves back to its normal position by the usual pedal return spring (not shown) and will drag the rod 7 with it. The block or body 6 together with the push rod 2 will not return until the wheel brake cylinders are relaxed and force the piston P in the master cylinder M to return.

The block or body 6 as herein disclosed is provided with a boss or extension 20 to which is engaged an end portion of a retractile spring 21. This spring 21 is so mounted to normally impose pull upon the block or body 6, the tension of the spring of course being increased when the block or body 6 is moved under the action of the pedal B.

As hereinbefore stated the travel of the clutch pedal C together with the clutch clearance is regulated by the screw 9 and the push rod 7' is shorter in length than the push rod 7 to allow the clutch to be adjusted clear off before the push rod 7' operates to impose push on the piston P through the rod 2. When the pedal C is employed to make the brake system effective, the body or block 6 will readily move independently of the push rod 7 and without in any way effecting the pedal B. By this means it is to be readily understood that when required the clutch pedal C may be employed to operate the brake system and particularly when it is desired to hold the vehicle on an up-grade so that the other foot of the operator will be free to control the gas.

In some makes of vehicles the distance between the master cylinder and the pedals is rather close. As illustrated in Figure 4, in order to work within this limited space the lock nut 22 for holding the rod 2' to the block or member 6' also serves as an adapter to which is securely anchored an end portion of a sleeve 18', the opposite end portion of said sleeve being anchored to the outstanding flange 17' of the master cylinder M. This nut 22 in its periphery is provided with circumferentially spaced pockets or recesses 23 to allow for the use of a conventional spanner wrench in connection therewith.

In the embodiment of my invention as particularly illustrated in Figure 3, the block or member 6ª is provided with the bores or cylinders 5ª and 5ᵇ in which operate the push rods 7ª and 7ᵇ. The extent of inward movement of the rods 7ª and 7ᵇ in their respective bores or cylinders is regulated by the members 9ª threading into the inner ends of the bores or cylinders 5ª and 5ᵇ. The push rod 2ª for coaction with the piston Pª of the master cylinder is anchored to the block or body 6ª at a point midway of the bores or cylinders 5ª and 5ᵇ. The inner portions of these bores or cylinders 5ª and 5ᵇ are also provided with the plugged openings 24 which provide for the desired application of the grease. Aside from these structural changes just referred to this embodiment of the invention operates in the same manner as has hereinbefore been recited in connection with the invention as illustrated in Figures 1 and 2.

In the embodiment of my invention as illustrated in Figures 5 and 6 of the drawings, a single cylinder 25 is employed and in which are snugly mounted for rectilinear movement the push rods 26 and 26'. These rods are semi-circular in cross section with their flat faces, as particularly illustrated in Figure 6, contacting. The push rod 26' is of a length less than that of the push rod 26 for the same reasons as has hereinbefore been set forth with respect to the push rod 7' in the first embodiment of my invention.

The inner end of the cylinder 25 is closed and threading through said closed end 27 is an end portion of a piston push rod 28 for coaction with the piston 29 working in the master cylinder 30. The end portion of the push rod 28 extending within the cylinder 25 is adapted to be contacted by the inserted end of either of the push rods 26 and 26'. The outer end portion of the cylinder 25 is provided in its wall with the opposed slots 31 through which extend the outstanding pins 32 carried by the adjacent end portions of the rods 26 and 26'. One of these pins 32 has operative connected, as at 33, with a brake pedal B' and the second of said pins has operative connection, as at 34, with a clutch pedal C'. The operation of this embodiment of my invention is upon the same principle as has hereinbefore been set forth with respect to the former embodiments, the only difference being in its simpler construction.

In Figure 7 is illustrated an embodiment of the invention wherein the rods 26ᵃ and 26ᵇ are continued by the shanks 35. These shanks 35 are round in cross section and extend through a head 36 of the cylinder 25ᵃ. A shank 35 is preferably provided by turning down an end portion of a strip of material from which a rod 26ᵃ or 26ᵇ is formed so that such shank and rod are integrally connected with the shank at substantially the axial center of the rod. This turning down of the material to provide a shank results in the provision of a shoulder 37 at the outer end of each of the rods 26ᵃ and 26ᵇ which constitutes a stop for coaction with the adjacent head 36 of the cylinder 25ᵃ. This head 36 may be held in any desired manner to the cylinder 25ᵃ but is preferably welded. The second head 38 of the cylinder 25ᵃ has engaged therewith the rod 39 for proper connection with the piston of the master cylinder while the shanks 35 are to be connected with the brake and clutch pedals. The device as illustrated in Figure 7 may be operated to cause the rods 26ᵃ and 26ᵇ to push against one head, as 38, of the cylinder 25ᵃ or to pull against the second head 36 of the cylinder. It is believed to be obvious that in this embodiment of my invention suitable provision may be made for lost motion in the clutch linkage for applying the brake.

Again referring to the invention as illustrated in Figures 1 and 2, it is believed to be obvious that the head or adapter 10 can be set on the rod 7 in such a position as to allow said head or adapter to contact with the adjacent end of the cylinder 5 on which said rod 7 operates and thus act as a stop for limiting the movement of the rod 7 with respect to the body or block 6. It is to be stated that the distance between the bearing 4 at the outer extremity of the rod 2 and the coupling or connection 8 can be adjusted or varied by screwing the rod 2 in or out of the block 6, said rod being effectively held in its desired adjustment by a conventional block nut 40.

In the embodiment of the invention in Figure 3, the rod 2ᵃ is also capable of endwise adjustment by threading into or out of the block 6ᵃ and being held in its selected adjustment by a lock nut 41. While in the embodiment of the invention as illustrated in Figure 5, a similar endwise adjustment of the rod 28 may be had by threading the same into or out of the cylinder 25, said rod 28 being maintained in its desired adjustment by the lock nut 42.

From the foregoing description it is thought to be obvious that a braking system for a vehicle constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In combination with the piston of the master cylinder of a hydraulic brake system for a vehicle together with the brake pedal and clutch pedal comprised in the transmission mechanism for the vehicle, a member, an operative connection between said member and the piston of the master cylinder, floating rods carried by the member, one of said rods being operatively connected to the brake pedal and the other of said rods being operatively connected with the clutch pedal, the movement of either of said pedals in one direction coacting with the member to move said member in a direction to make the piston effective.

2. In combination with the piston of the master cylinder of a hydraulic brake system for a vehicle together with the brake pedal and clutch pedal comprised in the transmission mechanism for the vehicle, a member, an operative connection between said member and the piston of the master cylinder, floating rods carried by the member, one of said rods being operatively connected to the brake pedal and the other of said rods being operatively connected with the clutch pedal, the movement of either of said pedals in one direction coacting with the member to move said member in a direction to make the piston effective, the floating rod operatively engaged with the clutch pedal having limited independent movement before transmitting movement to the member.

3. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, and a pair of floating push rods carried by the member, the movement of said floating rods in one direction coacting with the member to move the member in a direction to impose push upon the piston, and means for connecting one of said floating push rods to the brake pedal and means for operatively connecting the second floating push rod to the clutch pedal.

4. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, a pair of floating push rods carried by the member, the movement of said floating rods in one direction coacting with the member to move the member in a direction to impose push upon the piston, means for connecting one of said floating push rods to the brake pedal and means for operatively connecting the second floating push rod to the clutch pedal, the floating push rod operatively connected with the clutch pedal being of a length less than the length of the other floating push rod to allow declutching movement of the clutch pedal before imposing push upon the piston.

5. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, a pair of floating push rods carried by the member, the movement of said floating rods in one direction coacting with the member to move the member in a direction to impose push upon the piston, means for connecting one of said floating push rods to the brake pedal and means for operatively connecting the second floating push rod to the clutch pedal, the floating push rod operatively connected with the clutch pedal being of a length less than the length of the other floating push rod to allow declutching movement of the clutch pedal before imposing push upon the piston, and means for regulating the extent of such independent movement of the floating push rod operatively connected to the clutch pedal.

6. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, a pair of floating push rods carried by the member, the movement of said floating rods in one direction coacting with the member to move the member in a direction to impose push upon the piston, means for connecting one of said floating push rods to the brake pedal and means for operatively connecting the second floating push rod to the clutch pedal, the floating push rod connected to the brake pedal being in alignment with the push rod coacting with the piston.

7. In combination with the piston of the master cylinder of a hydraulic brake system for a vehicle together with the brake pedal and clutch pedal comprised in the transmission mechanism for the vehicle, a member, an operative connection between said member and the piston of the master cylinder, floating rods carried by the member, one of said rods being operatively connected to the brake pedal and the other of said rods being operatively connected with the clutch pedal, the movement of either of said pedals in one direction coacting with the member to move said member in a direction to make the piston effective, the member having a separate cylinder for each of the floating push rods.

8. In combination with the piston of the master cylinder of a hydraulic brake system for a vehicle together with the brake pedal and clutch pedal comprised in the transmission mechanism for the vehicle, a member, an operative connection between said member and the piston of the master cylinder, floating rods carried by the member, one of said rods being operatively connected to the brake pedal and the other of said rods being operatively connected with the clutch pedal, the movement of either of said pedals in one direction coacting with the member to move said member in a direction to make the piston effective, the member having a single cylinder in which both of the floating push rods operate.

9. A braking system including a brake pedal, a clutch pedal, a brake operating element, a member, an operative connection between said member and the brake operating element, floating rods carried by the member, one of said rods being operatively connected to the brake pedal and the other of said rods being operatively connected to the clutch pedal, either of said pedals operating independently of the other to make the brake operating element effective without moving the second pedal.

10. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, said push rod being endwise adjustable with respect to the member, and a pair of floating push rods carried by the member, the movement of said floating rods in one direction coacting with the member to move the member in a direction to impose push upon the piston, and means for connecting one of said floating push rods to the brake pedal and means for operatively connecting the second floating push rod to the clutch pedal.

11. In combination with a vehicle having a hydraulic braking system including a master cylinder having a piston working therein together with a brake pedal and a clutch pedal comprised in the transmission for the vehicle, a member, a push rod carried by said member for coaction with the piston of the master cylinder, said push rod being endwise adjustable with respect to the member, means for locking said push rod in selected adjustment, and a pair of floating push rods carried by the member, the movement of said floating rods in one direction coacting with the member to move the member in a direction to impose push upon the piston, and means for connecting one of said floating push rods to the brake pedal and means for operatively connecting the second floating push rod to the clutch pedal.

12. In combination with the piston of the master cylinder of a hydraulic brake system for a vehicle together with the brake pedal and clutch pedal comprised in the transmission mechanism for the vehicle, a member, an operative connection between said member and the piston of the master cylinder, floating rods carried by the member, one of said rods being operatively connected to the brake pedal and the other of said rods being operatively connected with the clutch pedal, the movement of either of said pedals in one direction coacting with the member to move said member in a direction to make the piston effective, and means for varying the distance between the operative connections with the piston of the master cylinder and with the pedals.

RAYMOND ROURKE.